(12) United States Patent
Menon et al.

(10) Patent No.: US 8,452,724 B2
(45) Date of Patent: May 28, 2013

(54) TECHNIQUES FOR CREATING REPORTS USING CACHED DATA

(75) Inventors: Prakash Menon, Cupertino, CA (US); Saravanan Ramasamy, TamilNadu (IN)

(73) Assignee: Oracle International Corporation, Redwood Shores, CA (US)

( * ) Notice: Subject to any disclaimer, the term of this patent is extended or adjusted under 35 U.S.C. 154(b) by 902 days.

(21) Appl. No.: 12/136,515

(22) Filed: Jun. 10, 2008

(65) Prior Publication Data

US 2009/0307257 A1    Dec. 10, 2009

(51) Int. Cl.
*G06F 7/00*   (2006.01)
*G06F 17/00*  (2006.01)
*G06F 17/30*  (2006.01)

(52) U.S. Cl.
USPC .......................... 707/603; 707/662; 707/666

(58) Field of Classification Search
None
See application file for complete search history.

(56) References Cited

U.S. PATENT DOCUMENTS

| | | | | |
|---|---|---|---|---|
| 6,236,661 B1 * | 5/2001 | Ballard | ......................... | 370/410 |
| 6,516,324 B1 * | 2/2003 | Jones et al. | .................... | 707/805 |
| 7,603,376 B1 * | 10/2009 | Narayanaswamy | .................. | 1/1 |
| 2003/0101234 A1 * | 5/2003 | McBrearty et al. | ........... | 709/218 |
| 2005/0192995 A1 * | 9/2005 | Li et al. | ......................... | 707/101 |

* cited by examiner

*Primary Examiner* — Susan Chen
(74) *Attorney, Agent, or Firm* — Kilpatrick Townsend & Stockton LLP

(57) ABSTRACT

Techniques for generating reports from cached data are provided. When a report is requested, a date and time when data in the report data cache was generated is compared with a date and time when data was collected by each of one or more data collectors that gather data used to generate the report data. If one of the data collectors has collected data since the data for the report in the report data cache has been updated, the data for the requested report will be regenerated from the data collected from each of the data collectors associated with the report and the regenerated data inserted into the report data cache. Subsequent requests for the report can be satisfied by generating the report using the data stored in the report data cache rather than regenerating the report data each time a request for a report is received.

12 Claims, 4 Drawing Sheets

TECHNIQUES FOR CREATING REPORTS USING CACHED DATA

BACKGROUND OF THE INVENTION

The present application relates to report generation systems and more particularly to techniques for creating reports using cached data.

Report generation systems are commonly used to create reports from data. For example, report generation systems are commonly used to create reports from data stored in data stores such as data warehouses, which are commonly used to store historical enterprise data for historical and reporting purposes.

Reports may include a large amount of data that is derived from one or more data sources. For example, creation of a report may require gathering of data from extremely large data sets and/or data derived from data sets using one or more complex calculations. Vast amounts of data often have to be analyzed and amalgamated for reporting purposes. As a result, processing required for creating a report may consume a lot of system resources.

For example, in an on-demand reporting system where reports are created on demand upon receiving a report generation request, a great deal of processing may be required each time a report is to be created. In a typical conventional on-demand report generation system, upon receiving a request to create a report, processing is performed to determine the data to be used for creating the report. This processing may involve identifying data from the data stores to be used for the report and also deriving data to be used for the report by performing calculations using the stored data. This processing is repeated each time that a report generation request is received, irrespective of whether or not the underlying data that is used for the report has changed or not since a previous report generation. Accordingly, on-demand reporting typically involves unnecessary processing leading to wastage of computing resources.

Some conventional report generation systems have attempted to address the problems of on-demand report generation systems by providing scheduled generation of the data used to create a report. At predetermined intervals, the data for the report is gathered from one or more data sources and stored in a data repository, such as a database. Users requesting a report are provided a copy of the report created from data that is stored in the data repository. However, because the data used to create the report is not generated at the time that the request to create the report is received, the data upon which the report is based may become stale. For example, if the data for a report is gathered from multiple data sources and the information provided by one of the data sources has changed since the data for the report has last been generated, reports created from the data will include stale data. One way to overcome this problem is to schedule the generation of the data for the report at frequent intervals, so that the data generated for the report is less likely to become stale. However, if the data is scheduled to be gathered from the set of data sources too often, substantial processing overhead may be spent regenerating data used to create the report regardless of whether the underlying data from the data sources has changed since the data for the report was last generated.

Accordingly, techniques for efficiently creating reports using cached data is desired.

BRIEF SUMMARY OF THE INVENTION

Embodiments of the present invention provide techniques for creating reports using cached data. Techniques are provided for determining whether a report includes cached data and for determining whether the cached data is out of date. If the data used to create the report is not out of date, the report is created using the cached data. Otherwise, if the data used to create the report is out of date, the data used to create the report is created using data collected from one or more data sources.

According to an embodiment of the present invention, a method for creating reports is provided. The method includes receiving a request to create a report, and determining if the data for the report is cached in a data cache. The data for the report that is stored in the data cache is created generated upon data stored in a repository. The method further comprises identifying a first time when the data stored in the data cache was last generated based upon the data stored in the repository, determining a set of one or more data collectors for the report, the one or more data collectors configured to store data in the repository, and determining if there exists at least one data collector in the set of data collectors for which a time when the data collector stored data in the repository is after the first time. The method further include, creating the report using the data for the report cached in the data cache if it is determined that there is no data collector in the set of data collectors for which a time when the data collector stored data in the repository is after the first time.

According to another embodiment of the present invention, a report generation system is provided. The report generation system includes a controller that is configured to receive a request to create a report and to determine that data for the report is cached in a data cache. The data for the report that is stored in the data cache is created generated upon data stored in a repository. The controller is further configured to identify a first time when the data stored in the data cache was last generated based upon the data stored in the repository, to determine a set of one or more data collectors for the report, the one or more data collectors configured to store data in the repository, and to determine if there exists at least one data collector in the set of data collectors for which a time when the data collector stored data in the repository is after the first time. The controller is further configured to create the report using the data for the report cached in the data cache upon determining that there is no data collector in the set of data collectors for which a time when the data collector stored data in the repository is after the first time.

According to yet another embodiment of the present invention, a computer readable medium storing a plurality of instructions for controlling a data processor to perform one or more tasks is provided. The computer readable medium includes an instruction that causes the data processor to receive a request to create a report and an instruction that causes the data processor to determine that data for the report is cached in a data cache. The data for the report that is stored in the data cache is created generated upon data stored in a repository. The computer readable medium also includes an instruction that causes the data processor to identify a first time when the data stored in the data cache was last generated based upon the data stored in the repository, an instruction that causes the data processor to determine a set of one or more data collectors for the report, the one or more data collectors configured to store data in the repository, and an instruction that causes the data processor to determine if there exists at least one data collector in the set of data collectors for which a time when the data collector stored data in the repository is after the first time. The computer readable medium also includes an instruction that causes the processor to create the report using the data for the report cached in the data cache upon determining that there is not data collector of the set of data collectors for which a time when the data collector stored data in the repository is after the first time.

Other features and advantages of the invention will be apparent in view of the following detailed description and embodiments.

The foregoing, together with other features, embodiments, and advantages of the present invention, will become more apparent when referring to the following specification, claims, and accompanying drawings. Where elements of the figures are called out with reference numbers, it should be understood that like reference numbers refer to like elements and might or might not be the same instance of the element.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for creating reports from cached data. Techniques are provided for creating and storing report data in a data cache and for creating reports from the data stored in the data cache.

Figure 1:
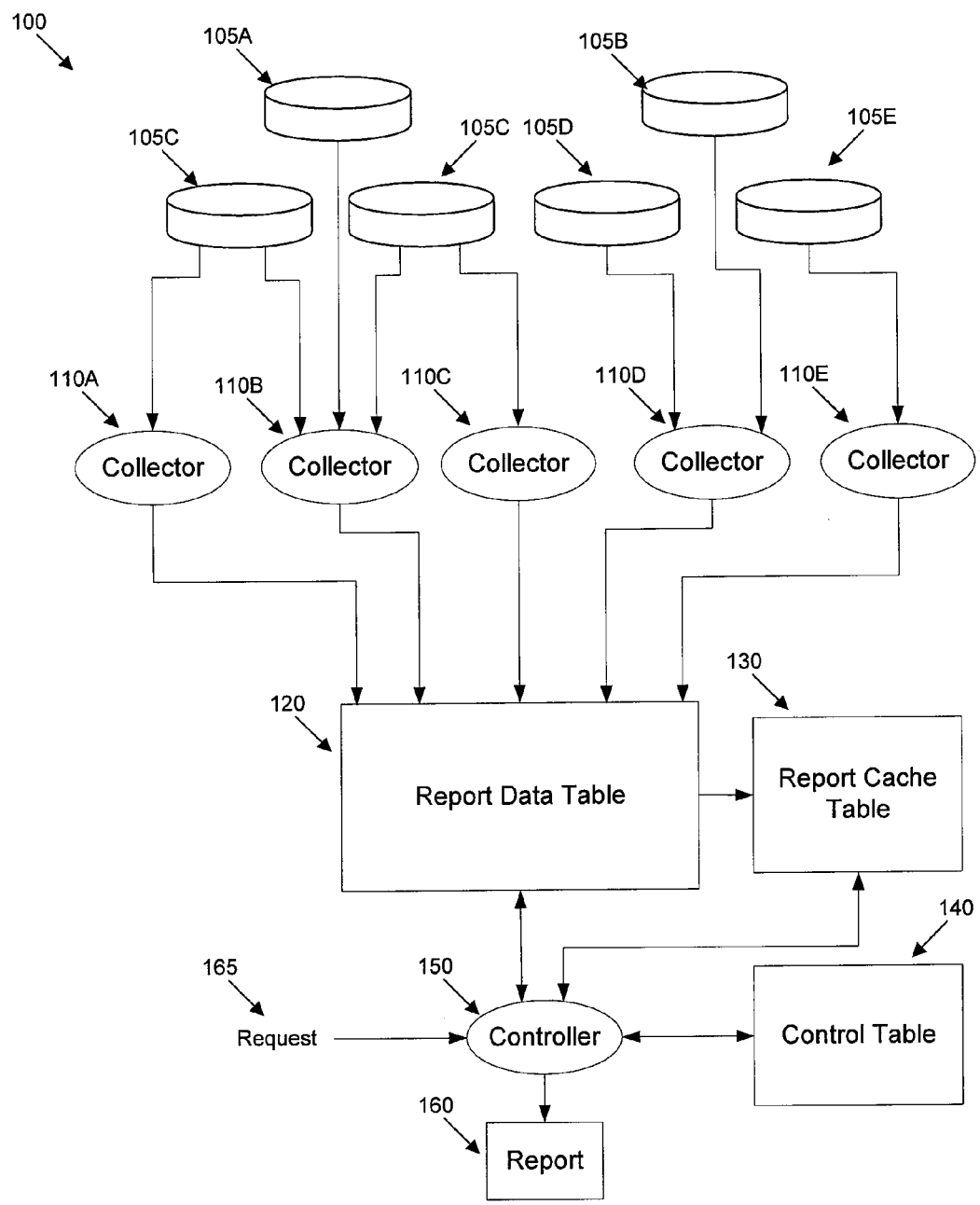
FIG. 1 is a block diagram of a report generation system according to an embodiment of the present invention.

FIG. 1 is a block diagram of a report generation system 100 according to an embodiment of the present invention. Report generation system 100 comprises a set of data sources 105A-105G, a set of data collectors 110A-110E, a report data table 120, a report cache table 130, a controller 150, and a control table 140. Data sources 105A-105G provide raw data that may be used to create one or more reports. Data sources 105A-105G may be of various types such as databases, Internet based content such as blogs, newsfeeds, websites, and/or other sources of data. Data collectors 110A-110E are configured to gather data from one or more of data sources 105A-105G and store the gathered data in report data table 120. According to one embodiment of the present invention, data collectors 100A-100E may be implemented as executable processes or scripts that are periodically executed according to a schedule, and may be scheduled to run on different dates and/or times.

Report data table 120 comprises data that may be used by report generation system 100 to create one more reports 160. Data collectors 100A-100E are configured to write the data gathered from data sources 105A-105G to report data table 120. In one embodiment of the present invention, data collectors 100A-100E are configured to first process the raw data gathered from data sources 105A-105G before writing the data to report data table 120. For example, data collectors 100A-100E may convert the raw data from a source data format to a target data format and/or perform other processing on the raw data before writing the data to report data table 120. According to some embodiments, data collectors 100A-100E are configured to automatically run on a periodic basis, and according to some other embodiments data collectors 100A-100E may also be run "on demand" upon receiving an instruction to run from a user or from a process which may or may not be part of report generation system 100.

The manner in which data is stored in report data table 120 may change from one embodiment to another. In one embodiment, report data table 120 may comprise a conventional relational database table configured to store data received from each of the data collectors 100A-100E. Data written to report data table 120 by data collectors 100A-100E is associated with an identifier that identifies the data collector that collected the data. For example, according to one embodiment, report data table 120 may include a "data collector" column for storing the data collector identifier identifying the data collector that collected data in each row of report data table 120. Associating the collector identifier with the data in report table 120 facilitates creating a report by enabling reporting system 100 to selectively access data collected by each data collector when generating data to be used in reports to, for each piece of data, identify the collector responsible for collecting the data and also to determine which data has been collected by a collector. Report data table 120 may store data that may be used to create one or more reports. The data for a report may be collected by one or more of data collectors 100A-100E.

According to an embodiment of the present invention, data for various reports is based upon data stored in report data table 120. Accordingly, the data for a report is generated based upon data stored in report data table 120. The generated data for a report may include portions of data stored by report data table 120 and/or also data that is derived from the data stored in report data table 120. Generating the data for a report may involve processing and analysis of data stored by report data table 120 and may include complex calculations that may take a significant amount of time and system resources to generate. The generated data may then be used to create a report.

According to an embodiment of the present invention, the data generated for a report is cached in report cache table 130. In one embodiment, for a report, report cache table 130 caches the most recent data generated for the report. Accordingly, the data cached in report cache table 130 for a report may comprise data from report data table 120 and collected by one or more of data collectors 100A-100E and also data that is derived based upon the data stored in report data table 120. As described below, the cached data, instead of regenerating the data from report data table 120, may be used for creating subsequent report as long as the cached data has not become stale. In this manner, data for a report does not have to be regenerated each time that a report request is received thereby providing significant savings in processing time and use of computing resources. At most, some formatting of data may have to be done for subsequent creation of reports.

As indicated above, the data cached in report cache table 130 may be used for report as long as the data is not stale. Data cached in report cache table 130 for a report is considered to have become stale if the data from report data table 120 upon which the report is based has been updated or overwritten with new data by one or more data collectors 110. For example, the data cached in report cache table 130 for a report is considered stale if the data from the report data table 120 that is included in the report data or which is used to derive data that is included in the report data has been updated or overwritten with new data in report data table 120. In this manner embodiments of the present invention provide for more efficient processing while ensuring that if the underlying data has changed then the report is based upon the new changed data.

Control table 140 stores information that is used by embodiments of the present invention to determine if data cached in report cache table 130 for a report is stale. In one embodiment, control table 140 stores information that maps reports that report generation system 100 is configured to create to one or more corresponding data collectors 100A-100E. For each report, the information in control table 140 maps the report to one or more data collectors that are configured to collect data upon which the report is based. Each report is thus mapped to one or more data collectors that are configured to collect data that is either included in the report or used to derive data that is included in the report. For each report, control table 140 also stores date and timing information regarding when the report was last created or when the data was written to report cache table 130. For each collector, control table 140 stores date and time information indicative of when the collector was last run and information stored in report data table 120. The date and timing information is used to determine whether, for a report, data from report cache table 130 may be used for creating the report or whether the data for the report needs to be regenerated from data stored in report data table 120. An embodiment of control table 140 is depicted in FIG. 2 and described below.

Controller 150 is configured to control the generation of reports in report generation system 100. Collector 150 may be implemented in software, or hardware, or combinations thereof. Controller 150 provides an interface for receiving requests to create reports. For example, in the embodiment illustrated in FIG. 1, controller 150 may receive a request 165 for creating a report 160. Request 165 may be received from a user via a user interface, or may be received from other interfaces, such as being generated by an executable process such as a PL/SQL statement or an executable program. Upon receiving a report creation request, controller 150 uses the information in control table 140 to determine whether the requested report may be created using data in report cache table 130 or whether the data for the requested report has to be determined and/or recreated from the data in report data table 120. If the data cached in report cache table 130 for the report is not stale, as determined based upon information in control table 140, then controller 165 creates the requested report 160 using the report data cached in report cache table 130. However, if the data cached in report cache table 130 for the requested report is stale or if table 130 does not comprise any data for the requested report, controller 150 creates the report using data stored in report data table 120. The report data is then cached in report cache table 130 for subsequent use. The information in control table 140 is also updated.

Upon receiving the request, controller 150 uses the information in control table 140 to determine whether request report may be created using data in report cache table 130 or whether the data for the requested report has to be determined and/or recreated from the data in report data table 120. Since control table 140 only stores information for reports that have been previously created, controller 150 first determines if the requested report has been previously created. Only those reports for which data is cached are included in control table 140. However, report generation system 100 may create other reports for which data is not cached. In the event that a report for which data is not cached is requested, controller 150 may hand the request off to other components of report generation system 100 for processing.

Figure 2:
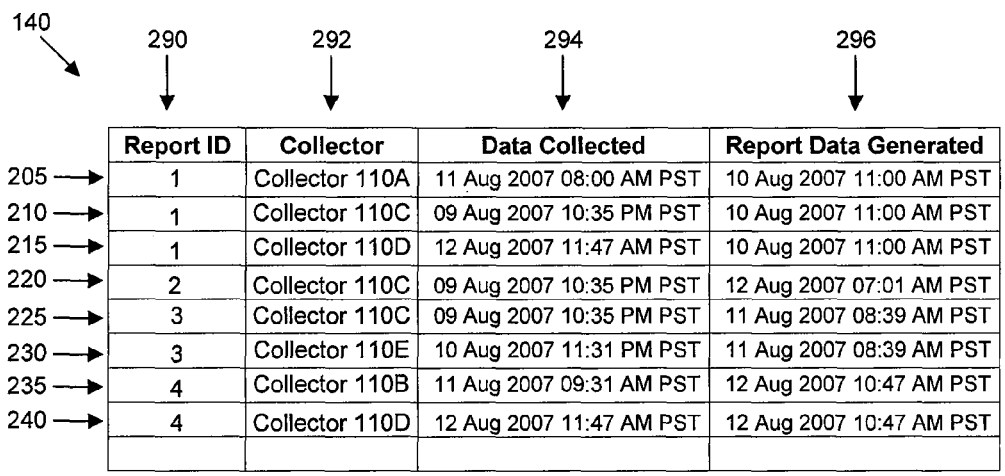
FIG. 2 is a control table for mapping reports to data sources according to an embodiment of the present invention.

FIG. 2 illustrates an example of control table 140 according to an embodiment of the present invention. As depicted in FIG. 2, control table 140 comprises a report ID column 290, a collector column 292, a data collected column 294, and a report data generated column 296. Table 140 stores information for reports that have been previously created by system 100 and whose report data is cached in report cache table 130. Report generation system 100 may also be configured to generate other reports that do not include cached data, and thus, are not included in control table 140. If a request is received for a report that is not included in control table 140, the report is created using data stored in report data table 120.

For each report included in control table 140, control table 140 stores information mapping the report to one or more data collectors that are configured to collect data upon which the report is based. As described above, the data collectors are configured to gather information from one or more data sources and store the data in report data table 120. Accordingly, for a piece of data stored in report data table 120, the collector that collected that piece of data is known. Further, for a report, it is known which pieces of data from report data table 120 are to be used for creating the report. This enables each report to be mapped to one or more data collectors that collect data used for creating that report. Each report identified in control cache 140 is thus mapped to one or more data collectors that are configured to collect data that is either included in the report or used to derive data that is included in the report.

As depicted in FIG. 2, table 140 may comprise multiple rows. For each row in table 140: (a) a report is identified in column 290 (identified in FIG. 2 using a report identifier); (b) column 292 identifies a single collector associated with the report identified in column 290; (c) column 294 comprises a timestamp indicating a data and time that the data collector referenced in column 292 most recently collected data from one or more of data sources 105A-105G and inserted the data gathered into report data table 120; (d) column 296 stores a timestamp that indicates the date and time that the data used to create the report identified in column 290 was most recently generated and the generated data stored in report data cache 130.

The information in control table 140 is continually updated. Each time a collector stores data to report data table 120, the information in column 294 for each row entry in control table 140 identifying the collector in column 292 is updated to reflect the new date and time. Each time the data is regenerated for a report from data stored in report data table 120 and the generated data stored in report data cache 130, the information in column 296 for each row entry in control table 140 identifying the report in column 290 is updated to reflect the new date and time.

As depicted in FIG. 2, control table 140 may include multiple rows for each report, each row mapping the report to a collector. For example, in FIG. 2, report 1 (identified by ReportId=1) is based upon data collected by collector 110A (row 205), collector 110C (row 210) and collector 110D (row 215). Report 2 (identified by ReportID=2) is associated with collector 110C (row 2). Report 3 (identified by ReportID=3) is associated with collectors 110C (row 225) and 110E (row 230). Report 4 (identified by ReportID=4) is associated with collectors 110B (row 235) and 110D (row 240). A report may thus be mapped to one or more collectors.

One skilled in the art will recognize that other configurations and formats may be used for storing the data in control table 140. For example, according to some alternative embodiments, the data stored in control table 140 may instead be stored in a plurality of tables. For example, in one embodiment, the control data is stored in three separate tables: a first table for associating a report ID with one or more data sources, a second table for storing when each report was last run, and a third table for storing when data in report data table 120 was last updated by each of the various data sources. The information may also be stored in other formats.

As previously described, controller 150 uses the information in control table 140 to determine whether the data cached in report cache table 130 for a report is stale or not. If the data for a report is determined to be stale, then the data for that report has to be regenerated using data in report data table 120. In this scenario, the cached data in report cache table 130 is not used for report generation. If the data for a report in report cache table 130 is determined not to be stale, then the data in report cache table 130 is used for creating the report. In this scenario, the report data does not have to be regenerated from the information stored in report data table 120. Details related to the processing for determining whether the cached data is stale or not are described below with reference to FIG. 3.

Figure 3:
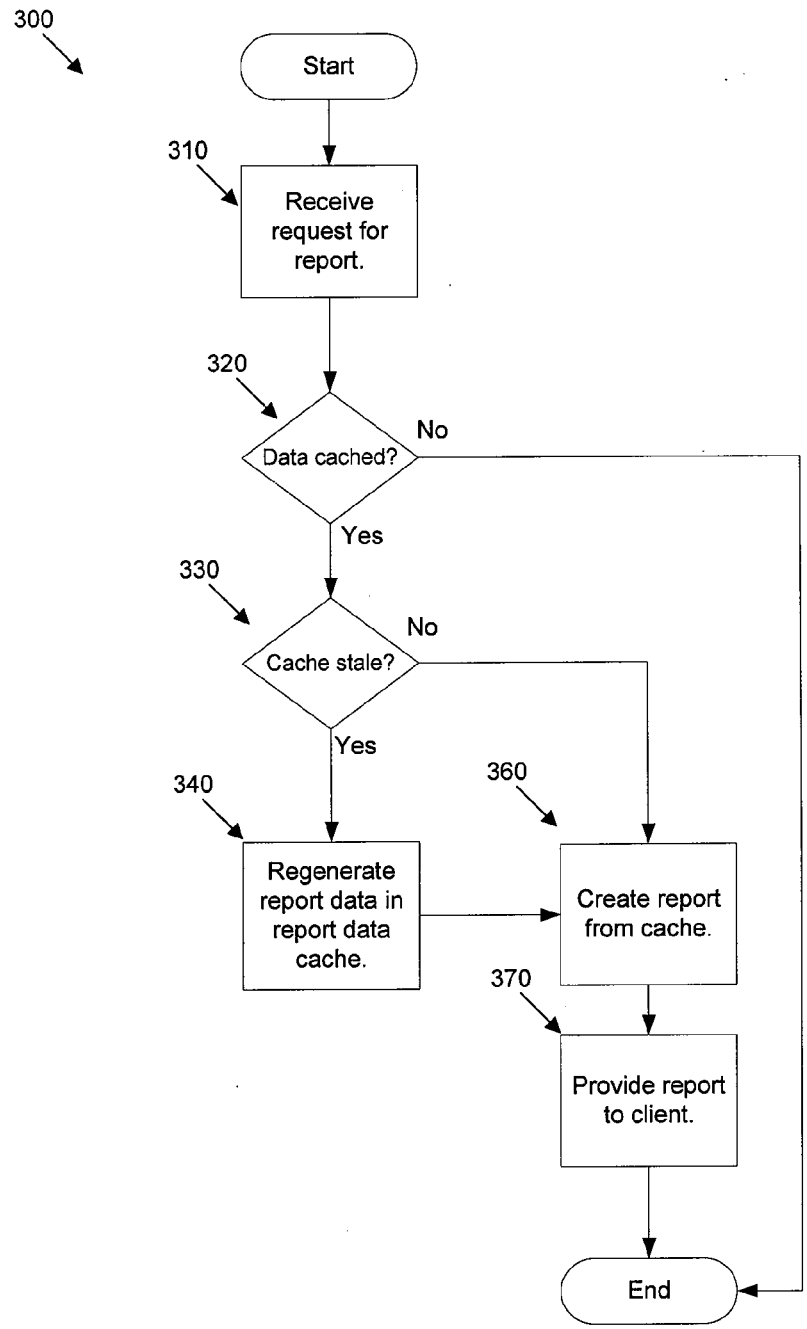
FIG. 3 is a flow diagram of a method for caching report data according to an embodiment of present invention.

FIG. 3 is a simplified flow diagram of a method 300 for creating a report according to an embodiment of the present invention. Method 300 may be performed by software (e.g. program code, instructions) executed by a processor, by hardware, or a combination thereof. In one embodiment, the processing may be performed by controller 150 depicted in FIG. 1. In the embodiment depicted in FIG. 3, the method is initiated upon receiving a request in step 310 to create a report. The request may be received from many different sources such as from a user via a user interface, from an executable process or program, from another system, etc. In one embodiment, the report to be created may be identified using a report ID. In other embodiments, the report ID may be determined from information in the request regarding the report.

Method 300 continues with step 320, where a determination is made whether the requested report is one for which data may be cached in report cache table 130. In one embodiment processing performed in step 320 comprises accessing control table 140 and determining if control table 140 comprises at least one row for which the report identifier in column 290 of the row matches the report identifier of the report requested in step 310. If control table 140 does not contain any row whose report identifier matches the report identifier of the requested report, then this indicates that data for the requested report has not been cached in report cache table 130. In such a scenario, processing may continue with step 340 as described below or may terminate and report generation may be handed off to other components of report generation system 100 for processing.

If control table 140 comprises one or more rows whose report identifiers match the report identifier of the requested report, then this indicates that data for the requested table has been cached in report cache table 130 and the matching rows are selected for further processing and processing proceeds with step 330. For example, referring back to control table 140 illustrated in FIG. 2, if a report having a report ID of "1" is requested, rows having a value of "1" in report ID column 290 are selected. Since rows 205, 210 and 215 in control table 140 are associated with report 1, these rows are selected for further processing.

At step 330, a determination is made whether the data cached in report cache table 130 for the requested report is stale. In one embodiment, the data cached in report cache table 130 for a report is considered stale if the data from report data table 120 upon which the report is based has been updated or overwritten with new data by one or more data collectors 110. Controller 150 may use the information in control table 140 to determine if cached data for the requested report is stale. In one embodiment, for each row in control table 140 in which column 290 contains the report identifier for the requested report (i.e., the rows, if any, selected in 320), controller 150 compares the timestamp in the data collected column 294 to the timestamp in report data generated column 296. If, for any one of the selected one or more rows, the date and time of the timestamp in the data collected column 294 is later than the date and time of the timestamp in report data generated column 296, this indicates that the data in report cache table 130 for that report is stale, because at least one of the data collectors associated with the report has been run and stored more recent data in report data table 120 since the previous generation of the data for the report and caching of the data for the report in report cache table 130. If data for the report has not yet been created in report cache table 130 (for example, if the report has not yet been requested), the report data generated column 296 may be blank. In the event that report data generated column 296 is blank, the data in the cache is processed as if the data were stale. If the data in report cache table 130 is stale, then method 300 continues with step 340. Otherwise, method 300 continues with step 360.

The processing performed in steps 320 and 330 may be illustrated using the control table depicted in FIG. 2. Assuming that the request report in step 310 is a report with report identifier "1," in step 310, controller 150 determines that control table 140 comprises three rows (rows 205, 210, and 215) corresponding to report 1 and maps to data collectors collector 110A, collector 110C, and collector 110D. In step 320, upon comparing the timestamps in column 294 with the timestamp in column 296 for each of the three rows, it is determined that the data for report 1 was previously generated and the data cached in control table 140 on Aug. 10, 2007 at 11:00 am PST (rows 205, 210 and 215, column 296). Further, it is determined that collector 110A was last run on Aug. 11, 2007 at 8:00 am PST (row 205, column 294), collector 110C was last run on Aug. 9, 2007 at 10:35 pm PST (row 210, column 294), and collector 110D was last run on Aug. 12, 2007 at 11:47 am PST (row 215, column 294). Upon comparing the timestamps in column 296 with the timestamps in column 294, it is determined that collectors 110A and 110D have been run the data in report data table 120 updated more recently than the data has been generated for report 1. As a result, it is determined in step 330 that the data cached in report cache table 130 for report 1 is stale and processing continues with step 340.

If the report request in step 310 is a report with report identifier "2", in 310, controller 150 determines that control table 140 comprises one row (row 220) corresponding to report 2 and is associated with data collector 110C. In step 320, upon comparing the timestamps in column 294 with the timestamp in column 296 for row 220, it is determined that data for report 2 was previously created and the data cached in control table 140 on Aug. 12, 2007 at 07:01 am PST (row 220, column 296). Further, it is determined that collector 110C was last run on Aug. 9, 2007 at 10:35 pm PST (row 220, column 296). Upon comparing the timestamp in column 296 with the timestamp in column 294, it is determined that the data for report 2 has been generated after the collector last updated the data in report data table 120. As a result, it is determined in step 330 that the data cached in report cache table 130 for report 2 is not stale and processing continues with step 360.

If the report request in step 310 is a report with report identifier "3", in 310, controller 150 determines that control table 140 comprises two rows (rows 225 and 230) corresponding to report 3 and the report maps to data collectors 110C and 110E. In step 320, upon comparing the timestamps in column 294 with the timestamp in column 296 for rows 225 and 230, it is determined that report 2 was previously generated and the data cached in control table 140 on Aug. 12, 2007 at 07:01 am PST (row 220, column 296). Further, it is determined that collector 110C was last run on Aug. 9, 2007 at 10:35 pm PST (row 220, column 296). Upon comparing the timestamps in column 296 with the timestamps in column 294, it is determined that the data for report 3 has been generated and the data cached in report cache table 130 later than the execution of both collectors 110C and 110E. As a result, it is determined in step 330 that the data cached in report cache table 130 for report 3 is not stale and processing continues with step 360.

If the report request in step 310 is a report with report identifier "4", in 310, controller 150 determines that control table 140 comprises two rows (rows 235 and 240) corresponding to report 4 and the report maps to data collectors 110B and 110D. In step 320, upon comparing the timestamps in column 294 with the timestamp in column 296 for rows 235 and 240, it is determined that collector 110D has run and updated report data table 120 on Aug. 12, 2007 at 11:47 am PST which is later than the time Aug. 12, 2007 at 10:47 am PST (rows 235 and 240, column 396) when the data used to create report 4 was last generated and the data cached in report cache table 130. As a result, it is determined in step 330 that the data cached in report cache table 130 for report 3 is stale and processing continues with step 340.

At step 340, the data for creating the requested report is regenerated from the data in report data table 120 and the report created using the regenerated data. As part of 340, the regenerated data is cached in report data cache 130 for subsequent use. Time information in control table 140 is also updated to reflect the regeneration and caching of the data. Controller 150 may regenerate the data for a report by executing one or more executable scripts or processes, such as PL/SQL scripts to gather the data used to produce the report from report data table 120. The executable scripts and/or processes may access report data table 120 and process the data collected by the collectors associated with the report (as determined from control table 140) and write the data generated for the report to report cache table 130.

In an embodiment of the present invention, a report comprises one or more fields into which data is to be inserted when the report is created, and the report may be defined by mapping each field in the report to a column of report data table 120. A mapping table may be provided to associate each field of the report with a column of report data table 120 that includes data used to populate the field. When data for the report is regenerated, such as in step 340 of method 300, the mapping table is used to determine which column of report data table 120 corresponds to a field of the report, report data table 120 is accessed to gather data from that column, and data for the field is regenerated using the data gathered from the column of report data table 120. As indicated above, controller 150 may regenerate the data for the report from data in report data table 120 by executing one or more executable scripts and/or processes, and the one or more executable scripts and/or processes may access the mapping table in order to determine which columns of report data table 120 correspond to fields in the report. Once the data for the report has been regenerated, the data may be stored in report cache table 130, and the report may be created from the data in report cache table 130 until the data in report cache table 130 becomes stale.

At step 360, the requested report is created from the data cached in report cache table 130. As a result no regeneration of data using data from report data table 120 is done. In some embodiments of the present invention, processing in step 360 may involve processing, such as formatting the data into an appropriate presentation format, and the like. Accordingly, in step 360, the data for the report is accessed from report cache table 360, and any additional processing, if any, is performed using the data accessed from report cache table 130. In one embodiment of the present invention, one or more executable scripts, such as a SQL scripts, may be provided for creating the report from data stored in report cache table 130. These scripts may then be provided executed by controller 150 to create the requested report.

At step 370, the report created in step 360 is provided to the report requester.

As described above, data for a report is regenerated only upon determining that the cached data for the report is stale (i.e., at least one associated data collector associated with the report has been run and updated the report data table 120 subsequent to the most recent time that the report data was generated and cached in report cache table 130). Otherwise, the data cached in cache table 130 is used to create the report without the need for regeneration of the report data. This improves the efficiency of the report generation process and provides saving in both time and computing resources needed for generation of a report.

Figure 4:
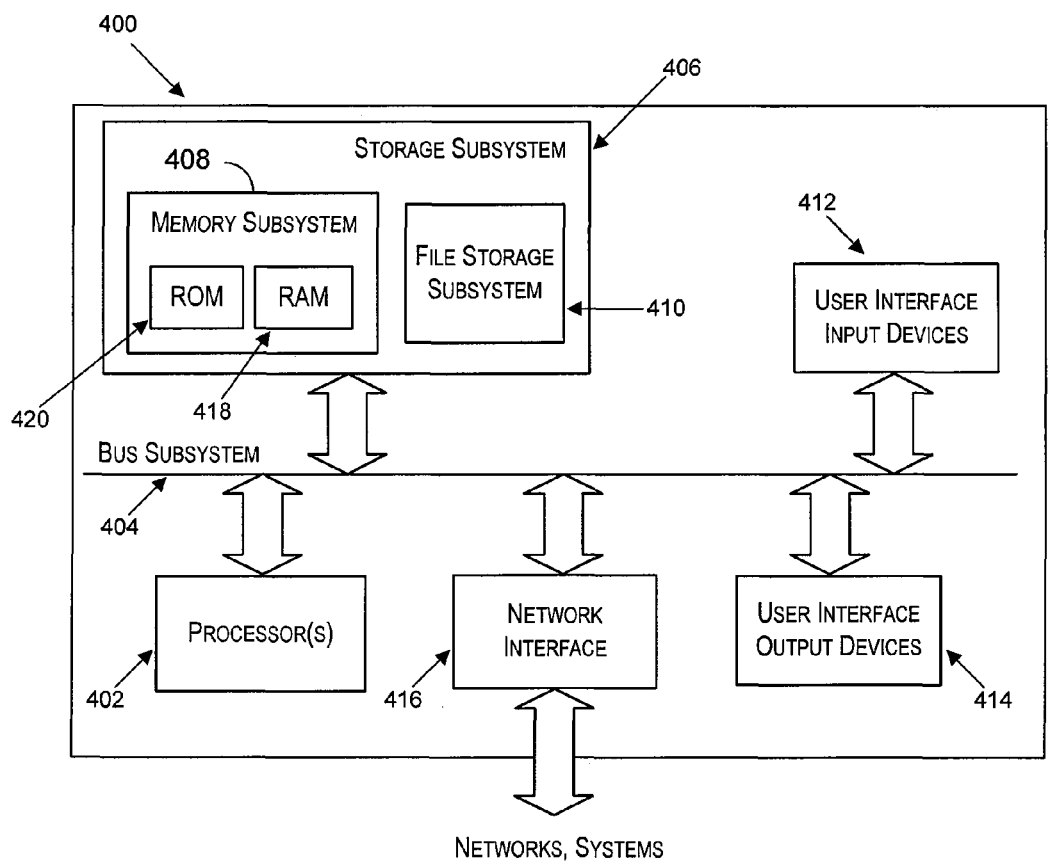
FIG. 4 is a block diagram of a computer system in which the report generation system of FIG. 1 may be implemented according to an embodiment of present invention.

FIG. 4 is a simplified block diagram of a computer system 400 upon which a system for loading data into a partitioned database table, such as system 100 of FIG. 1, may be implemented according to an embodiment of present invention. As shown in FIG. 4, computer system 400 includes a processor 402 that communicates with a number of peripheral subsystems via a bus subsystem 404. These peripheral subsystems may include a storage subsystem 406, comprising a memory subsystem 408 and a file storage subsystem 410, user interface input devices 412, user interface output devices 414, and a network interface subsystem 416.

Bus subsystem 404 provides a mechanism for letting the various components and subsystems of computer system 400 communicate with each other as intended. Although bus subsystem 404 is shown schematically as a single bus, alternative embodiments of the bus subsystem may utilize multiple busses.

Network interface subsystem 416 provides an interface to other computer systems, networks, and portals. Network interface subsystem 416 serves as an interface for receiving data from and transmitting data to other systems from computer system 400.

User interface input devices 412 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 400.

User interface output devices 414 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 400.

Storage subsystem 406 may be configured to store the basic programming and data constructs that provide the functionality of the present invention. Software (code modules or instructions) that provides the functionality of the present invention may be stored in storage subsystem 406. These software modules or instructions may be executed by processor(s) 402. Storage subsystem 406 may also provide a repository for storing data used in accordance with the present invention. Storage subsystem 306 may comprise memory subsystem 408 and file/disk storage subsystem 410.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 400 can be of various types including a personal computer, a portable computer, a workstation, a network computer, a mainframe, a kiosk, a server or any other data processing system. Due to the ever-changing nature of computers and networks, the description of computer system 400 depicted in FIG. 4 is intended only as a specific example for purposes of illustrating the an embodiment of a computer system that may be used to implement the present invention. Many other configurations having more or fewer components than the system depicted in FIG. 4 are possible.

Embodiments of the present invention address the problems of conventional report generation system by employing an approach that includes the benefits of on-demand reporting, where the data used in the report is always up to date, and the benefits of a scheduled system, where reports are not regenerated every time that the report is requested.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs comprising a plurality of instructions for controlling a data processor to perform various tasks incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for generating a report comprising:
receiving at a report generation system a request to create a report;
determining by the report generation system that data for the report is cached in a data cache, the data for the report that is stored in the data cache is generated based upon data stored in a repository;
identifying by the report generation system a first time when the data stored in the data cache was generated based upon the data stored in the repository;
determining by the report generation system a set of one or more data collectors for the report, the one or more data collectors configured to store data in the repository;
determining by the report generation system whether the data stored in the data cache is out of date, wherein the data stored in the data cache is determined to be out of date when there exists at least one data collector in the set of data collectors for which a second time that the data collector stored data in the repository is after the first time and determining the data stored in the data cache is out of date further comprises accessing a control table, wherein information in the control table identifies one or more data collectors for the report, stores a timestamp indicating a date and time when the one or more data collectors for the report most recently collected data, and stores a timestamp indicating a date and time when the data stored in the data cache was generated and stored in the data cache, determining based on the control table the one or more data collectors for the report, the one or more data collectors configured to store data in the repository, and determining based on the control table there exists at least one data collector in the one or more data collectors for which a time when the data collector stored data in the repository is after the first time;
in response to determining that the data stored in the data cache is not out of date, creating the report by the report generation system using the data for the report cached in the data cache; and
in response to determining that the data stored in the data cache is out of date, regenerating by the report generation system data for the report based upon data stored in the repository, storing by the report generation system the regenerated data in the data cache, and creating the report by the report generation system based upon the regenerated data.

2. The method of claim 1 where upon storing the regenerated data in the data cache, updating by the report generation system the first time with a time when the data was regenerated.

3. The method of claim 1 wherein regenerating data for the report based upon data stored in the repository further comprises:
accessing data in the repository created by the set of one or more data collectors for the report;
creating data for the report based upon the data in the repository created by the one or more data collectors for the report; and
inserting the data for the report into the repository.

4. The method of claim 3 wherein creating the data for the report further comprises:
performing one or more transformations on the data in the repository created by the one or more data collectors for the report.

5. A report generation system comprising:
a processor; and
a memory communicatively coupled with the processor and having stored therein instructions which, when executed by the processor, cause the processor to:
receive a request to create a report;
determine that data for the report is cached in a data cache, the data for the report that is stored in the data cache is generated based upon data stored in a repository;
identify a first time when the data stored in the data cache was generated based upon the data stored in the repository;
determine a set of one or more data collectors for the report, the one or more data collectors configured to store data in the repository;

determine whether the data stored in the data cache is out of date, wherein the data stored in the data cache is determined to be out of date if there exists at least one data collector in the set of data collectors for which a second time that the data collector stored data in the repository is after the first time and determining the data stored in the data cache is out of date further comprises accessing a control table, wherein information in the control table identifies one or more data collectors for the report, stores a timestamp indicating a date and time when the one or more data collectors for the report most recently collected data, and stores a timestamp indicating a date and time when the data stored in the data cache was generated and stored in the data cache, determining based on the control table the one or more data collectors for the report, the one or more data collectors configured to store data in the repository, and determining based on the control table there exists at least one data collector in the one or more data collectors for which a time when the data collector stored data in the repository is after the first time;

in response to determining that the data stored in the data cache is not out of date, create the report using the data for the report cached in the data cache; and in response to determining that the data stored in the data cache is out of date, regenerate data for the report based upon data stored in the repository, store the regenerated data in the data cache, and create the report based upon the regenerated data.

6. The report generation system of claim 5 wherein, upon storing the regenerated data in the data cache, the instructions further cause the processor to:

update the first time with a time when the data was regenerated.

7. The report generation system of claim 5 wherein, when regenerating data for the report based upon data stored in the repository, the instructions further cause the processor to:

access data in the repository created by the set of one or more data collectors for the report;

create data for the report based upon the data in the repository created by the one or more data collectors for the report; and insert the data for the report into the repository.

8. The report generation system of claim 7 wherein, when creating the data for the report, the instructions further cause the processor to:

perform one or more transformations on the data in the repository created by the one or more data collectors for the report.

9. A computer readable memory storing a plurality of instructions for controlling a data processor to perform one or more tasks, the plurality instructions comprising:

an instruction that causes the data processor to receive a request to create a report;

an instruction that causes the data processor to determine that data for the report is cached in a data cache, the data for the report that is stored in the data cache is generated based upon data stored in a repository;

an instruction that causes the data processor to identify a first time when the data stored in the data cache was generated based upon the data stored in the repository;

an instruction that causes the data processor to determine a set of one or more data collectors for the report, the one or more data collectors configured to store data in the repository;

an instruction that causes the data processor to determine whether the data stored in the data cache is out of date, wherein the data stored in the data cache is determined to be out of date if there exists at least one data collector in the set of data collectors for which a second time that the data collector stored data in the repository is after the first time and determining the data stored in the data cache is out of date further comprises accessing a control table, wherein information in the control table identifies one or more data collectors for the report, stores a timestamp indicating a date and time when the one or more data collectors for the report most recently collected data, and stores a timestamp indicating a date and time when the data stored in the data cache was generated and stored in the data cache, determining based on the control table the one or more data collectors for the report, the one or more data collectors configured to store data in the repository, and determining based on the control table there exists at least one data collector in the one or more data collectors for which a time when the data collector stored data in the repository is after the first time;

an instruction that causes the data processor to, in response to determining that the data stored in the data cache is not out of date, create the report using the data for the report cached in the data cache; and instructions that cause the data processor to, in response to determining that the data stored in the data cache is out of date, regenerate data for the report based upon data stored in the repository, store the regenerated data in the data cache, and create the report based upon the regenerated data.

10. The computer readable memory of claim 9, further comprising:

an instruction that causes the data processor to, upon storing the regenerated data in the data cache, update the first time with a time when the data was regenerated.

11. The computer readable memory of claim 9 wherein when regenerating data for the report based upon data stored in the repository, the computer readable medium further comprises:

an instruction that causes the data processor to access data in the repository created by the set of one or more data collectors for the report;

an instruction that causes the data processor to create data for the report based upon the data in the repository created by the one or more data collectors for the report; and an instruction that causes the data processor to insert the data for the report into the repository.

12. The computer readable memory of claim 11 wherein when creating the data for the report, the computer readable medium further comprises:

an instruction that causes the data processor to perform one or more transformations on the data in the repository created by the one or more data collectors for the report.

* * * * *